United States Patent
Yokoyama et al.

(10) Patent No.: US 7,859,635 B2
(45) Date of Patent: Dec. 28, 2010

(54) LIQUID CRYSTAL DISPLAY PANEL AND MANUFACTURING METHOD THEREOF

(75) Inventors: Naoto Yokoyama, Mie (JP); Naru Usukura, Tenri (JP)

(73) Assignee: Sharp Kabushiki Kaisha, Osaka (JP)

( * ) Notice: Subject to any disclaimer, the term of this patent is extended or adjusted under 35 U.S.C. 154(b) by 754 days.

(21) Appl. No.: 10/574,617

(22) PCT Filed: Oct. 8, 2004

(86) PCT No.: PCT/JP2004/014927

§ 371 (c)(1),
(2), (4) Date: Apr. 5, 2006

(87) PCT Pub. No.: WO2005/038518

PCT Pub. Date: Apr. 28, 2005

(65) Prior Publication Data

US 2007/0121051 A1    May 31, 2007

(30) Foreign Application Priority Data

Oct. 16, 2003  (JP)  ............................. 2003-355955
Dec. 25, 2003  (JP)  ............................. 2003-431013

(51) Int. Cl.
G02F 1/1339    (2006.01)
(52) U.S. Cl. ...................... 349/155; 349/156; 349/157
(58) Field of Classification Search .......... 349/155–157
See application file for complete search history.

(56) References Cited

U.S. PATENT DOCUMENTS

| | | | |
|---|---|---|---|
| 5,499,128 A * | 3/1996 | Hasegawa et al. | 349/155 |
| 5,680,189 A | 10/1997 | Shimizu et al. | |
| 5,815,232 A | 9/1998 | Miyazaki et al. | |
| 5,969,784 A * | 10/1999 | Miyazaki et al. | 349/155 |
| 6,010,384 A | 1/2000 | Nishino et al. | |
| 6,067,144 A * | 5/2000 | Murouchi | 349/156 |
| 6,259,500 B1 * | 7/2001 | Kijima et al. | 349/113 |
| 6,323,921 B1 * | 11/2001 | Kurauchi et al. | 349/106 |
| 6,411,360 B1 | 6/2002 | Matsuyama et al. | |
| 6,638,781 B1 | 10/2003 | Hirakata et al. | |

(Continued)

FOREIGN PATENT DOCUMENTS

CN    1284707 A    2/2001

(Continued)

*Primary Examiner*—David Nelms
*Assistant Examiner*—Charles Chang
(74) *Attorney, Agent, or Firm*—Birch, Stewart, Kolasch & Birch, LLP

(57) ABSTRACT

A liquid crystal display panel includes two substrates fixed together by a seal member with their main surfaces opposed to each other, liquid crystal sealingly stored in a region surrounded by the two substrates and the seal member, and a plurality of columnar spacers arranged in a region surrounded by the two substrates and the seal member. A number density of the columnar spacers in a low-density region near the inner side of the seal member is smaller than that in a high-density region inside the low-density region. The substrate with the spacer has the substrate and the spacer formed on the substrate. The spacer has at least a first spacer portion, and a second spacer portion formed above the first spacer portion. An upper portion of the first spacer has a larger diameter than a bottom of the second spacer portion.

6 Claims, 10 Drawing Sheets

U.S. PATENT DOCUMENTS

| | | | |
|---|---|---|---|
| 6,705,584 B2* | 3/2004 | Hiroshima et al. | 249/155 |
| 6,888,608 B2* | 5/2005 | Miyazaki et al. | 349/156 |
| 7,088,418 B1 | 8/2006 | Yamashita et al. | |
| 2001/0026348 A1 | 10/2001 | Murata et al. | |
| 2003/0071956 A1 | 4/2003 | Sasaki et al. | |
| 2003/0117570 A1 | 6/2003 | Kim | |
| 2004/0114087 A1* | 6/2004 | Cho et al. | 349/155 |
| 2005/0185129 A1* | 8/2005 | Kim et al. | 349/156 |

FOREIGN PATENT DOCUMENTS

| | | |
|---|---|---|
| EP | 1 076 257 A2 | 2/2001 |
| JP | 2000-89026 A | 3/2000 |
| JP | 2000-227599 A | 8/2000 |
| JP | 2001-33779 A | 2/2001 |
| JP | 2001-147437 A | 5/2001 |
| JP | 2001-281678 A | 10/2001 |
| JP | 2001-337331 A | 12/2001 |
| JP | 2002-229040 A | 8/2002 |
| JP | 2003-121857 A | 4/2003 |
| JP | 2003-131238 A | 5/2003 |
| JP | 2003-207785 | 7/2003 |
| TW | 493096 | 7/2002 |
| TW | 556035 | 10/2003 |

* cited by examiner

LIQUID CRYSTAL DISPLAY PANEL AND MANUFACTURING METHOD THEREOF

TECHNICAL FIELD

The present invention relates to a liquid crystal display panel and a method of manufacturing the same, and particularly to a liquid crystal display panel including a columnar spacer as well as a method of manufacturing the same.

Also, the present invention relates to a substrate provided with a spacer arranged on the substrate. The substrate with the spacer according to the invention is adhered to a substrate opposed thereto, and thereby a constant space can be kept between these substrates.

BACKGROUND ART

A liquid crystal display panel includes a substrate provided with drive elements for driving liquid crystal as well as a substrate provided with opposed electrodes opposed thereto, and these substrates are adhered together with their main surfaces opposed to each other with a space of several micrometers therebetween.

FIG. 11 is a schematic cross section of a liquid crystal display panel according to a prior art. For the sake of simplicity, FIG. 11 does not show drive elements, opposed electrodes and alignment films formed on main surfaces of substrates. A sealed space surrounded by two substrates 1a and 1b and a seal member 2 is filled with liquid crystal 6. Columnar spacers 5 arranged in this space define a distance between substrates 1a and 1b.

For manufacturing the liquid crystal display panel, the two substrates must be adhered together by the seal member with main surfaces thereof opposed to each other, and a region surrounded by the two substrates and the seal member must be filled with the liquid crystal.

A vacuum filling method has been known as one of methods of filling a space with liquid crystal according to a prior art. In this method, two substrates are first adhered by a seal member together with their main surfaces opposed together while applying a pressure thereto. The seal member has an annular form, and is provided at a portion thereof with an opening. When a distance between the two substrates attains a predetermined value, the seal member is cured. Then, the substrates adhered together are cut into sizes of a predetermined display panel. The substrates thus cut are arranged inside a vacuum container, and a vacuum is produced in the vacuum container to produce a vacuum in the space between the substrates. After sufficiently exhausting a gas, the liquid crystal is brought into contact with the opening at the seal member, and the vacuum container is opened to an atmospheric pressure. The liquid crystal is supplied into the space between the substrate by the pressure difference between the pressure in the space between the substrates and the atmospheric pressure as well as the interfacial tension. After a predetermined quantity of liquid crystal is supplied, the opening at the seal member is sealed to store sealingly the liquid crystal. This method of sealingly storing the liquid crystal in the vacuum filling method suffers from a problem that the filling time increases with the size of the liquid crystal display panel.

In recent years, therefore, a method called a "drop adhering method" has been performed for sealingly storing the liquid crystal (see, e.g., Japanese Patent Laying-Open No. 2001-281678). In the drop adhering method, drive elements, opposed electrodes and others are first formed on each of two substrates. Also, spacers for fixing a distance between the substrates are arranged on one of the substrates. Further, an annular seal member(s) for adhering the two substrates is arranged on one or both of the substrates. In this operation, the seal member is not provided with an opening, and is arranged in a closed annular form. Drops of a predetermined quantity of liquid crystal are put on one of the substrates. The two substrates are adhered together in a vacuum with a high position accuracy, and then are exposed to the atmospheric pressure. Thereafter, the seal member is cured to store sealingly the liquid crystal between the two substrates.

In the drop adhering method, the space surrounded by the two substrates and the seal member is closed by performing the adhesion. Since this adhesion is performed in a vacuum, air does not mix into the space filled with the liquid crystal, and only the liquid crystal is present therein. Therefore, by exposing the two substrates to the atmospheric pressure after adhering them in the vacuum, the two substrates are entirely and uniformly compressed together by the atmospheric pressure. The seal member is compressed and collapsed to a predetermined thickness.

The spacers define the distance between the two substrates. The prior art has employed spherical plastic beads or the like as the spacers. In the structure employing the plastic beads, however, the liquid crystal material is not present in positions where the plastic beads are present, and the alignment does not occur in such positions so that leakage of back light, i.e., so-called "light leakage" occurs. In recent years, therefore, spacers of a columnar form (which will be referred to as "columnar spacers" in the invention) are formed as spacers on a substrate for adjusting a distance between the substrates (see, e.g., Japanese Patent Laying-Open No. 2003-131238). The columnar spacers are arranged in a region where interconnections are formed between picture elements, so that the light leakage can be prevented. Further, these spacers are resistant to collapse in the direction of thickness of the substrate, and can offer an advantage that irregularities do not occur in display even when a display screen of the liquid crystal display panel is pressed by a finger or the like.

In the conventional liquid crystal panel, spherical spacers such as plastic beads are dispersed on one of the substrates before adhering the substrates together for keeping a constant thickness of a liquid crystal layer between a TFT (Thin Film Transistor) substrate and a color filter substrate. However, this manner suffers from a problem of occurrence of irregular display due to irregular dispersion or movement of the beads.

For overcoming the above problem, a technique of forming column-structure spacers on a substrate has been developed. The column-structure spacers are formed by applying photosensitive resin onto the substrate and patterning the photosensitive resin by a photolithography method. The column-structure spacers can be formed at desired positions on the substrate surface, and do not move on the substrate surface so that irregular display does not occur. Further, the height thereof can be freely determined depending on manufacturing conditions. However, the liquid crystal material thermally extends in a high-temperature state so that the column-structure spacers cause irregular display due to nonuniformity in cell gap on the surface.

Japanese Patent Laying-Open No. 2001-147437 has disclosed that the irregular display due to changes in temperature can be prevented by storing an elastic energy in the columnar spacers. Each of Japanese Patent Laying-Open Nos. 2003-121857 and 2003-131238 has disclosed a structure in which two or more kinds of spacers having different heights or sectional areas are used for preventing the irregular display even when the liquid crystal material shrinks in a low temperature environment or an excessive load is applied thereto.

Japanese Patent Laying-Open No. 2002-229040 has disclosed a structure in which each columnar spacer has a concave or flat top portion for preventing a display failure due to local irregularities in cell thickness.

However, the spacer disclosed in the above patent reference has a high aspect ratio, and therefore is less resistant to elastic deformation so that the spacers may be damaged in a step of rubbing an alignment film, and may not function as the spacers.

In the method (which will be referred to as a "liquid crystal drop adhering method" hereinafter) of performing adhesion after putting drops of the liquid crystal material on the substrate surface, the thickness (cell gap) of the liquid crystal layer depends on the drop quantity of the liquid crystal material. Therefore, when an imbalance occurs between the height of resin spacer and the drop quantity of liquid crystal, an error occurs in display. More specifically, when a large drop quantity of liquid crystal is used, excessive liquid crystal causes irregular display. When the quantity is small, vacuum bubbles occur to cause a significant disadvantage. These vacuum bubbles often occur particularly during an operation of adhering the substrates or at a low temperature, and early overcoming of this problem has been desired.

For overcoming the problem, Japanese Patent Laying-Open No. 2001-281678 has disclosed a method in which a column height of a columnar spacer is measured, and a drop quantity of liquid crystal is controlled based on the measured value. However, when consideration is given to measurement errors, accuracy in control of drop quantity and changes in temperature, the method disclosed in Japanese Patent Laying-Open No. 2001-281678 is not sufficient for the above purpose.

Patent reference 1: Japanese Patent Laying-Open No. 2001-281678

Patent reference 2: Japanese Patent Laying-Open No. 2003-131238

Patent reference 3: Japanese Patent Laying-Open No. 2001-147437

Patent reference 4: Japanese Patent Laying-Open No. 2003-121857

Patent reference 5: Japanese Patent Laying-Open No. 2002-229040

DISCLOSURE OF THE INVENTION

Problems to be Solved by the Invention

The columnar spacers are more resistant to collapse in the height direction (i.e., the thickness direction of the substrate) than plastic beads and the like. The quantity of the applied liquid crystal can be readily controlled to apply a strictly accurate quantity of liquid crystal, but it is difficult in the formation of the columnar spacers to control accurately the size in the height direction, and variations occur in height of the columnar spacers. For example, variations of up to about ±0.2 μm may occur with respect to a designed value. Therefore, it is difficult to control the quantity of the applied liquid crystal in accordance with the height of the columnar spacers already formed, and this results in a problem of lowering the display quality.

FIGS. 12A and 12B illustrate disadvantages of a liquid crystal display panel according to a prior art. When columnar spacer 5 has a height lower than a designed value, the top surface of columnar spacer 5 is not in contact with substrate 1$b$ as shown in FIG. 12A so that a distance between the substrates cannot be kept strictly constant. This results in a problem of lowering the display quality. Conversely, when the columnar spacer has a height larger than the designed value, the space surrounded by two substrates 1$a$ and 1$b$ as well as seal member 2 is not fully filled with liquid crystal 6 as shown in FIG. 12B, and vacuum bubbles 28 occur to cause the problem of lowering the display quality. Even if vacuum bubbles 28 did not occur during the manufacturing of the liquid crystal display panel, the manufactured liquid crystal display panel may be used in an environment of a low temperature, in which case the liquid crystal condenses to produce the vacuum bubbles so that a similar problem occurs.

In Japanese Patent Laying-Open No. 2001-281678, it is proposed to measure the height of the columnar spacers and determine the drop quantity of liquid crystal based on the measured value. In this manufacturing method, the drop quantity of liquid crystal can be adjusted in accordance with the height of the columnar spacers, but it takes about 10 to 20 seconds for measuring the height of the columnar spacer in one position so that measurement of all the columnar spacers takes a very long time. Meanwhile, variations of about ±0.1 μm occur in height of the columnar spacers on the main surface of the substrate, and therefore, it is required to measure as many positions as possible. For measuring the heights of the many columnar spacers, a very long time is required, and the productivity lowers. If the heights of the columnar spacers are measured in fewer positions, the accuracy of the distance between the two substrates lowers.

In particular, such a manner may be employed that a large number of medium or small cells each having a diagonal size from 1.5 inches to 4 inches are formed on a large substrate, and then may be cut off from each other. Thus, multiple patterning may be performed. In this case, the drop quantity of liquid crystal must be controlled for each cell. This requires measuring of heights of a great number of columnar spears, and thus requires a very long time.

An object of the invention is to provide a liquid crystal display panel that does not complicate adhering operations, and prevents lowering of the display quality as well as a method of manufacturing the same.

Another object of the invention is to reduce display irregularities due to irregularities in cell gap on a surface. Still another object of the invention is to suppress effectively damages on spacers due to rubbing processing. Yet another object of the invention is to reduce the display irregularities due to changes in temperature and an excessively large or small drop quantity of liquid crystal.

Means for Solving the Problems

In a first aspect of a liquid crystal display panel according to the invention, the liquid crystal display panel includes two substrates fixed together by a seal member with their main surfaces opposed to each other, liquid crystal sealingly stored in a region surrounded by the two substrates and the seal member, and a plurality of columnar spacers arranged in the region surrounded by the two substrates and the seal member. The column spacers are arranged such that a number density of the columnar spacers gradually decreases as the position moves from a center of a display region toward an outer periphery. Employment of this structure can provide the liquid crystal display panel that does not complicate the adhering operations, and prevents lowering of the display quality.

In a second aspect of the liquid crystal display panel according to the invention, the liquid crystal display panel includes two substrates fixed together by a seal member with their main surfaces opposed to each other, liquid crystal sealingly stored in a region surrounded by the two substrates and the seal member, and a plurality of columnar spacers arranged in the region surrounded by the two substrates and the seal member. A number density of the columnar spacers in a first region near an inner side of the seal member is smaller than that in a second region inside the first region. Employment of this structure can provide the liquid crystal display panel that does not complicate the adhering operations, and prevents lowering of the display quality.

In a third aspect of the liquid crystal display panel according to the invention, the liquid crystal display panel includes two substrates fixed together by a seal member with their main surfaces opposed to each other, liquid crystal sealingly stored in a region surrounded by the two substrates and the seal member, and a plurality of columnar spacers arranged in the region surrounded by the two substrates and the seal member. A number density of the columnar spacers in a first region except for a display region is smaller than that in a second region outside the first region. Employment of this structure can provide the liquid crystal display panel that does not complicate the adhering operations, and prevents lowering of the display quality.

In a fourth aspect of the liquid crystal display panel according to the invention, the liquid crystal display panel includes two substrates fixed together by a seal member with their main surfaces opposed to each other, liquid crystal sealingly stored in a region surrounded by the two substrates and the seal member, and a plurality of columnar spacers arranged in the region surrounded by the two substrates and the seal member. The columnar spacers include a first columnar spacer and a second columnar spacer being higher than the first columnar spacer when receiving no load. The first columnar spacer is arranged in a first region near an inner side of the seal member and a second region located inside the first region, and the second columnar spacer is arranged in the second region. Employment of this structure can provide the liquid crystal display panel that does not complicate the adhering operations, and prevents lowering of the display quality.

In a first aspect of a method of manufacturing a liquid crystal display panel according to the invention, the method includes a spacer forming step of forming columnar spacers on one or both of two substrates to be adhered together. The spacer forming step is configured to form the columnar spacers such that a number density of the columnar spacers decreases as the position moves from a center of a display region to be formed toward an outer periphery. By employing this method, it is possible to manufacture the liquid crystal display panel that does not complicate the adhering operations, and prevents lowering of the display quality.

In a second aspect of the method of manufacturing the liquid crystal display panel according to the invention, the method includes a spacer forming step of forming columnar spacers on one or both of two substrates to be adhered together, and a seal member arranging step of arranging a seal member on a main surface(s) of one or both of the substrates to be adhered together. The spacer forming step is configured to form the columnar spacers such that a number density of the columnar spacers in a first region near an inner side of the seal member is smaller than that in a second region inside the first region. By employing this method, it is possible to manufacture the liquid crystal display panel that does not complicate the adhering operations, and prevents lowering of the display quality.

In a third aspect of the method of manufacturing the liquid crystal display panel according to the invention, the method includes a spacer forming step of forming columnar spacers on one or both of two substrates to be adhered together, and a seal member arranging step of arranging a seal member on a main surface(s) of one or both of the substrates to be adhered together. The spacer forming step is configured to form the columnar spacers such that a number density of the columnar spacers in a first region avoiding a display region to be formed is smaller than that in a second region outside the first region. By employing this method, it is possible to manufacture the liquid crystal display panel that does not complicate the adhering operations, and prevents lowering of the display quality.

In the above invention, the method includes a liquid crystal drop applying step of applying a drop of liquid crystal to one or both of the two substrates, and the liquid crystal drop applying step applies a smaller amount of liquid crystal than a calculated value obtained when the two substrates are parallel spaced from each other by a distance of a designed value. Employment of this method can prevent lowering of the display quantity more reliably.

In a fourth aspect of the method of manufacturing the liquid crystal display panel according to the invention, the method includes a spacer forming step of forming columnar spacers on one or both of two substrates to be adhered together, and a seal member arranging step of arranging a seal member on a main surface(s) of one or both of the substrates. The spacer forming step is configured to form a first columnar spacer in a first region near an inner side of the seal member, and to form the first columnar spacer and a second columnar spacer higher than the first columnar spacer in a second region inside the first region. By employing this method, it is possible to manufacture the liquid crystal display panel that does not complicate the adhering operations, and prevents lowering of the display quality.

A substrate with a spacer of the invention includes a substrate and a spacer formed on the substrate, and the spacer has at least a first spacer portion and a second spacer portion formed above the first spacer portion. An upper portion of the first spacer portion has a larger diameter than a bottom of the second spacer portion.

The upper portion of the first spacer portion preferably has a groove surrounding the second spacer portion in a plan view.

Assuming that an upper portion of the spacer has a diameter of C, and the spacer has a height of H from the bottom to the upper portion, it is preferable that the spacer has a diameter of $(1.8 \times C)$ or more at the bottom, and has a diameter of $(1.05 \times C)$ or less at a height of $(0.85 \times H)$ from the bottom of the spacer.

A panel of the invention has the substrate with the spacer of the invention, an opposed substrate opposed to the substrate with the spacer, and a function material layer interposed between the substrate with the spacer and the opposed substrate. The function material layer includes a layer having a light transmittance modulated by a potential difference between electrodes opposed to each other, and a layer emitting light by itself according to a current flowing between the opposed electrodes. For example, the function material layer is a liquid crystal layer, inorganic or organic electroluminescence (EL) panel, light emission gas layer, electroluminescence layer or the like. Therefore, the panels of the invention include a liquid crystal panel as well as inorganic and organic panels.

A method of the invention is a method of manufacturing a liquid crystal display panel in a liquid crystal drop adhering manner. The method of the invention includes the steps of forming a frame-like seal member on a substrate surface of one of a substrate with a spacer and an opposed substrate; applying a liquid crystal material to an inside of a frame of the seal member; and adhering the substrate with the spacer and the opposed substrate together to form a liquid crystal layer.

EFFECTS OF THE INVENTION

The invention can provide the liquid crystal display panel that does not complicate the adhering operations, and prevent lowering of the display quality, and can also provide the method of manufacturing the same.

According to an aspect of the invention, uniform cell gaps can be obtained on the surface. According to another aspect of the invention, damages on the spacers due to rubbing processing can be effectively suppressed. Still another aspect of the invention, it is possible to reduce display irregularities due to changes in temperature and an excessively large or small drop quantity of liquid crystal.

DESCRIPTION OF THE REFERENCE SIGNS 1a and 1b: substrate, 2: seal member, 3: glass substrate, 5: columnar spacer, 6: liquid crystal, 7: picture element, 10: driver, 28: vacuum bubble, 29: high columnar spacer, 30: low columnar spacer, 31: high-density region, 32: low-density region, 33: high-low spacer arranged region, 34: low spacer arranged region, 35: display region, 38: liquid crystal storing region, 39: BM region, 40: compression width, 50, 51 and 52: arrows, 101 and 102: substrate, 103: peripheral seal member, 104: liquid crystal layer, 105: spacer, 105a: first spacer portion, 105b: second spacer portion, 105c: groove, 150: spacer

BEST MODES FOR CARRYING OUT THE INVENTION

First Embodiment

Referring to FIGS. 1A-7B, description will now be given on a liquid crystal display panel and a method of manufacturing the same of a first embodiment of the invention.

Figure 1A:
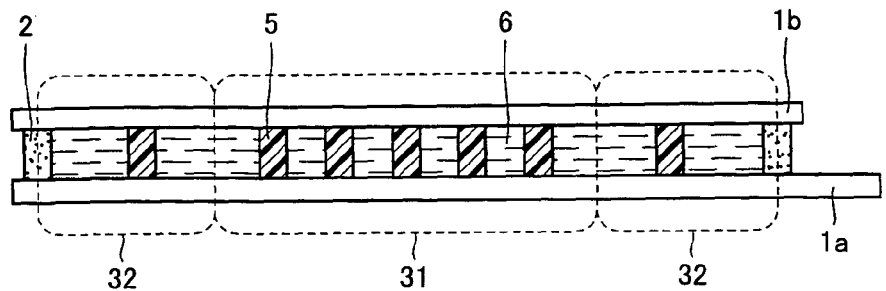
FIG. 1A is a schematic cross section of a first liquid crystal display panel of a first embodiment.
Figure 1B:
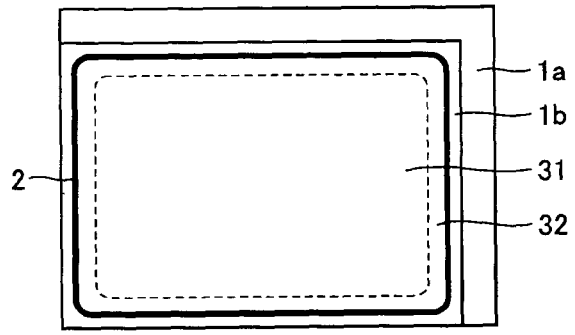
FIG. 1B is a schematic plan of the first liquid crystal display panel of the first embodiment.

FIGS. 1A and 1B illustrate a first liquid crystal display panel of the embodiment. FIGS. 1A and 1B are a schematic cross section and a schematic plan, respectively. As shown in FIG. 1A, two substrates 1a and 1b are adhered and fixed together by a seal member 2. Substrate 1a is provided at its main surface with drive elements and others, and substrate 1b is provided at its main surface with opposed electrodes (not shown) and others. An inner space or region surrounded by two substrates 1a and 1b and seal member 2 is sealingly filled with liquid crystal 6. Substrates 1a and 1b are adhered and fixed together with a space therebetween. Columnar spacers 5 determine the distance between the two substrates.

Columnar spacers 5 are arranged in the region filled with the liquid crystal. Columnar spacer 5 has a circular cylindrical form, and has upper and lower surfaces in contact with the respective substrates. The first liquid crystal display panel of this embodiment includes a low-density region 32 serving as a first region near an inner side of seal member 2. It also includes a high-density region 31 serving as a second region inside low-density region 32. A number density of columnar spacers 5 in low-density region 32 is smaller than that of high-density region 31. Thus, the region surrounded by seal member 2 is formed of the two regions, and the number density of columnar spacers 5 in the inner region is higher than that in the outer region. Seal member 2 is arranged along the outer periphery of substrate 1b. For example, low-density region 32 in FIG. 1B extends a width of 3 mm from seal member 2 toward a center of the display region. In high-density region 31, the distance between substrates 1a and 1b is substantially constant. Conversely, the distance between substrates 1a and 1b in low-density region 32 is substantially constant or gradually decreases as the position moves outward from the center of the display region.

Figure 2A:
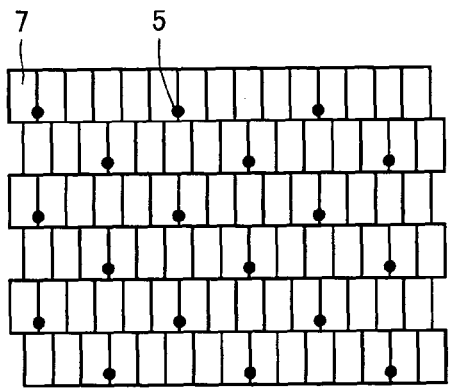
FIG. 2A is a first plan illustrating arrangement of columnar spacers of the first embodiment.
Figure 2B:
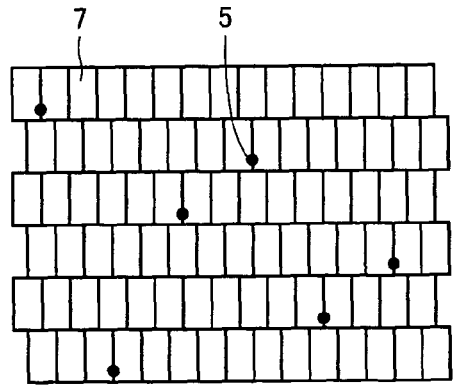
FIG. 2B is a second plan illustrating arrangement of columnar spacers of the first embodiment.

FIGS. 2A and 2B illustrate a state of arrangement of columnar spacers 5. FIG. 2A is a plan of high-density region 31, and FIG. 2B is a plan of low-density region 32. Columnar spacers 5 are arranged in interconnection regions formed at boundaries between picture elements. The number density of columnar spacers 5 arranged in high-density region 31 is larger than the number density of columnar spacers 5 arranged in low-density region 32. In the liquid crystal display panel that includes the picture elements each having, e.g., a longitudinal size of 115 μm and a lateral size of 65 μm, columnar spacers 5 each having a diameter of 10 μm and a height of 4.5 μm are arranged in the high-density region at a rate of one columnar spacer for five picture elements. Conversely, in the low-density region shown in FIG. 2B, columnar spacers 5 having the same size and form as the above are arranged at a rate of one columnar spacer for 15 picture elements.

The quantity of the liquid crystal sealingly stored in the embodiment is slightly smaller than a value which is calculated when the two substrates are parallel and spaced by a distance of a designed value from each other (and will be referred to as a "standard liquid crystal calculated value" hereinafter). In this embodiment, the quantity of the liquid crystal is equal to 96% of the standard liquid crystal calculated value.

Figure 3A:
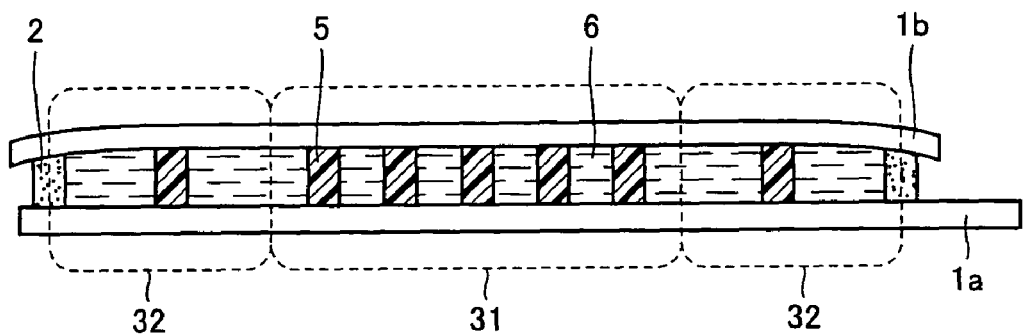
FIG. 3A is a first schematic cross section illustrating operations and effects of the liquid crystal display panel of the first embodiment.
Figure 3B:
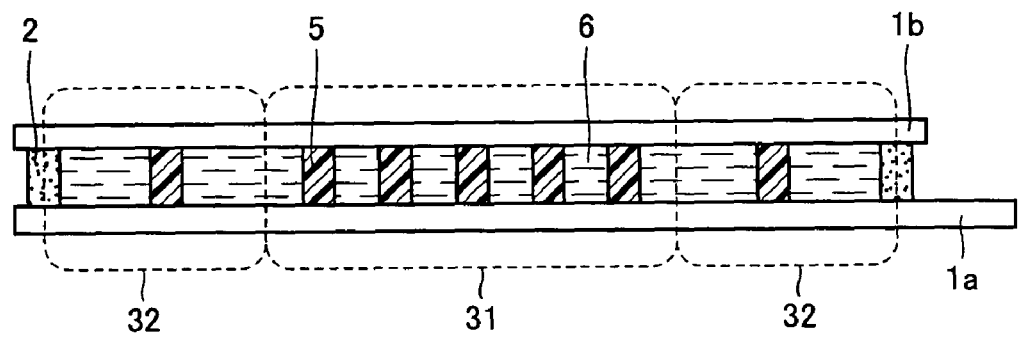
FIG. 3B is a second schematic cross section illustrating operations and effects of the liquid crystal display panel of the first embodiment.
Figure 3C:
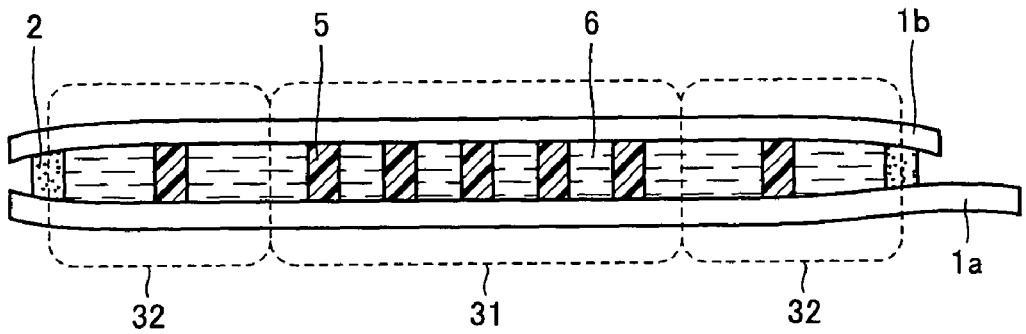
FIG. 3C is a third schematic cross section illustrating operations and effects of the liquid crystal display panel of the first embodiment.

FIGS. 3A-3C are cross sections illustrating operations and effects of the first liquid crystal display panel of the embodiment. In the drop adhering method, the drop quantity of liquid crystal can be strictly adjusted, but it is difficult to provide the columnar spacers accurately having a designed height. Therefore, manufacturing errors are liable to occur in height of the columnar spacers. FIG. 3A is a cross section of a structure in which columnar spacers 5 accurately have a designed height. In this embodiment, the quantity of the stored liquid crystal is 96% of the standard liquid crystal calculated value, and thus is slightly smaller than it. Columnar spacer 5 is resistant to compression in the height direction, but can be slightly compressed. As shown in FIG. 3A, therefore, the main surfaces of two substrates 1a and 1b are parallel to each other in high-density region 31 because columnar spacers 5 are arranged there at the high number density. In low-density region 32, since columnar spacers 5 are arranged at the low number density, the distance between two substrates 1a and 1b gradually decreases as the position moves from the center of the display region toward the outer periphery.

When columnar spacer 5 has a height lower than the designed value, the distance between two substrates 1a and 1b is constant not only in high-density region 31 but also in low-density region 32 as shown in FIG. 3B. Since columnar spacers 5 have a small height, this structure reduces a space that is defined by columnar spacers 5 and is surrounded by substrates 1a and 1b and seal member 2. Consequently, the intended small quantity of stored liquid crystal substantially matches with the volume of the space surrounded by substrates 1a and 1b and seal member 2, and the main surfaces of two substrates 1a and 1b become parallel to each other even in low-density region 32.

When formed columnar spacers 5 have the height larger than the designed value, the distance between substrates 1a and 1b decreases in low-density region 32 as the position moves outward from the center of the display region as shown in FIG. 3C. Liquid crystal 6 filling the space surrounded by substrates 1a and 1b and seal member 2 decreases in quantity. In high-density region 31, the number density of columnar spacers 5 is higher than that in low-density region 32 so that the distance between substrates 1a and 1b becomes substantially constant in high-density region 31. Conversely, in low-density region 32 containing columnar spacers 5 at a low number density, the distance between substrates 1a and 1b gradually decreases as the position moves outward from the central portion of the display region (i.e., from high-density region 31 toward low-density region 32).

As described above, the low-density region of the low number density is formed with respect to the high-density region located in the central portion of the display region so that the distance between the substrates decreases in the low-density region to prevent at least occurrence of vacuum bubbles even when variations are present in height of the columnar spacers, and therefore lowering of the display quality can be prevented. As is done in this embodiment, it is preferable that the sealingly stored liquid crystal is smaller in quantity than the standard liquid crystal calculated value determined when the two substrates are parallel spaced by a distance of the designed value. Employment of this structure can prevent lowering of the display quality in both the cases where the height of the columnar spacer is higher than the designed value and where it is lower than the designed value.

In this embodiment, the low-density region is formed near the inner side of the seal member. Thus, in the display region displaying pictures or the like, the low-density region extends from a peripheral portion thereof toward the outer side where the seal member is arranged. The invention is not restricted to this configuration, and may be configured such that the low-density region is formed in a central portion of the display region displaying pictures or the like, and the high-density region extends outward from the peripheral portion of the display region. However, in the case where a surface of a portion displaying pictures may be pressed by a finger or the like, irregularities may occur in the picture when the low-density region is locally pressed so that it is preferable to form the high-density region in a central portion of the display region and to form the low-density region in a peripheral portion of the display region. For example, when a user intends to touch a button on a display panel of a cellular phone, the user may make a mistake of pressing the display panel. Even in this case, the low-density region formed at the peripheral portion can prevent occurrence of irregularities in displayed pictures.

Figure 4A:
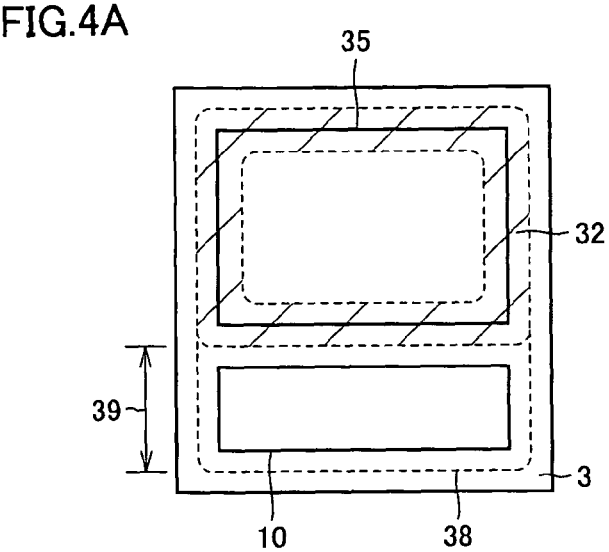
FIG. 4A is a first schematic plan of a second liquid crystal display panel of the first embodiment.
Figure 4B:
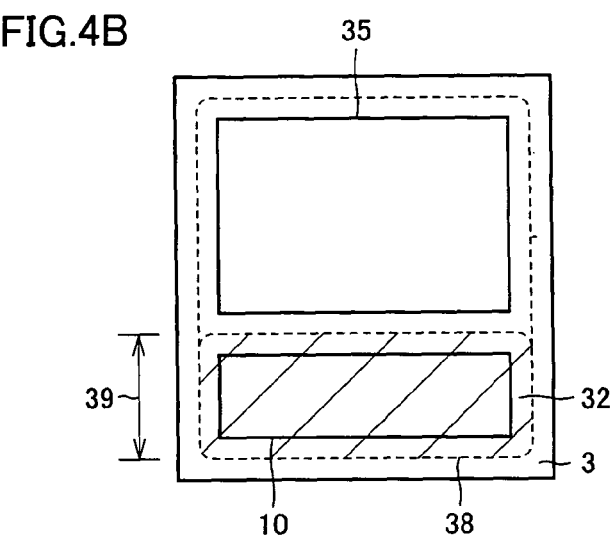
FIG. 4B is a second schematic plan of the second liquid crystal display panel of the first embodiment.

FIGS. 4A and 4B are schematic plans of a second liquid crystal display panel of the embodiment. The liquid crystal display panel shown in FIGS. 4A and 4B is of a type employing a CGS (Continuous Grain Silicon) liquid crystal in which a circuit operating TFTs for switching the liquid crystal and the like are formed on a glass substrate. The CGS liquid crystal is used in the display panel such as a digital still camera, a cellular phone or the like. In FIG. 4A, a glass substrate 3 is provided at its main surface with a display region 35 including TFTs (Thin Film Transistors) and others, and is also provided at the main surface with a driver 10 for driving the TFTs. The liquid crystal is sealingly stored in a liquid crystal storing region 38 completely containing display region 35 and driver 10. In a region provided with driver 10, there is formed a BM region 39 in which a black mask is formed on one of the substrates. In BM region 39, the mask conceals the inner side when viewed from the front side of the liquid crystal display panel.

In FIG. 4A, low-density region 32 is formed along the outer periphery of display region 35. In liquid crystal storing region 38, a high-density region is formed in a portion other than low-density region 32. More specifically, this portion is provided with columnar spacers arranged at a higher number density than low-density region 32. As described above, the invention can likewise be applied to the liquid crystal display panel of the CGS liquid crystal or the like.

FIG. 4B shows a structure of the liquid crystal display panel of the CGS liquid crystal in which low-density region 32 is formed at a region avoiding display region 35. By employing this structure, whole display region 35 can be the high-density region. As described above, it is not essential that low-density region 32 contains a portion of the display region, and low-density region 32 can be formed in any position. For example, the low-density region may be formed only between the seal member and the display region.

Figure 5:
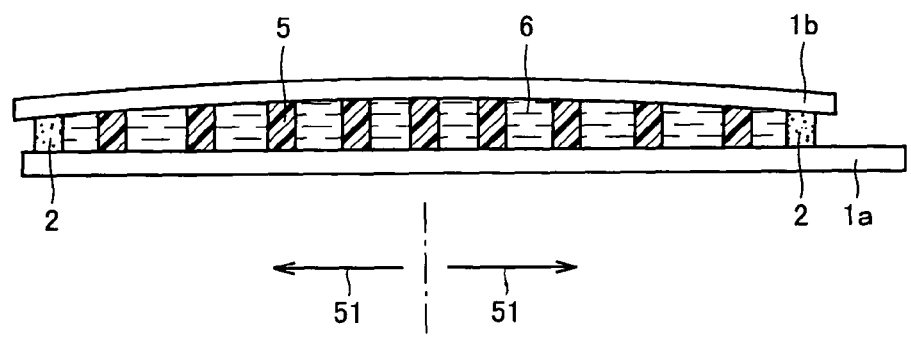
FIG. 5 illustrates a third liquid crystal display panel of the first embodiment.

FIG. 5 illustrates a third liquid crystal display panel of the embodiment. In the above embodiment, the two regions, i.e., high- and low-density regions are formed, and the number density of the columnar spacers is constant in each region. In contrast to this, the third liquid crystal display panel is provided with columnar spacers 5 of which number density decreases as the position moves from the center of the display region toward the outer periphery as indicated by arrows 51. By this structure, the liquid crystal display panel can achieve effects similar to those of the first liquid crystal display panel in this embodiment. In this case, it is preferable that the quantity of stored liquid crystal is slightly smaller than the standard liquid crystal calculated value. The liquid crystal display panel shown in FIG. 5 has the liquid crystal of a slightly small quantity as well as columnar spacers 5 formed accurately according to the designed values. In this liquid crystal display panel, the distance between substrates 1a and 1b gradually decreases as the position moves from the center of the display region toward the outer periphery.

Figure 6:
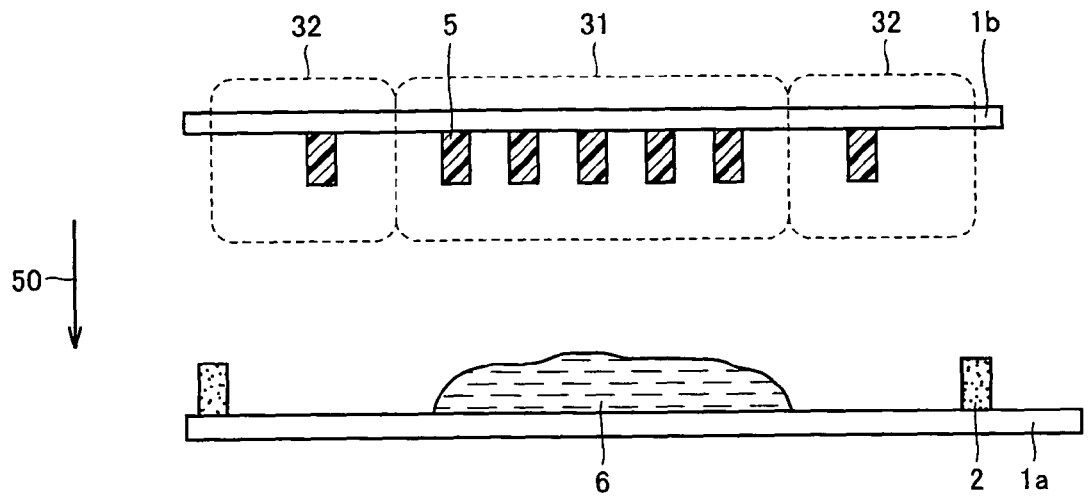
FIG. 6 illustrates a method of manufacturing the liquid crystal display panel of the first embodiment.
Figure 7A:
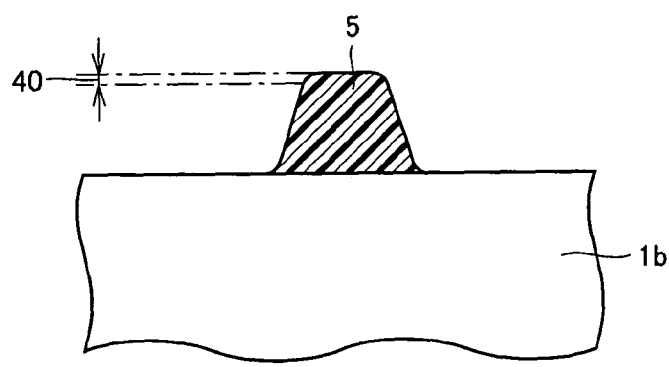
FIG. 7A is a first schematic cross section illustrating a manner compressing a columnar spacer.
Figure 7B:
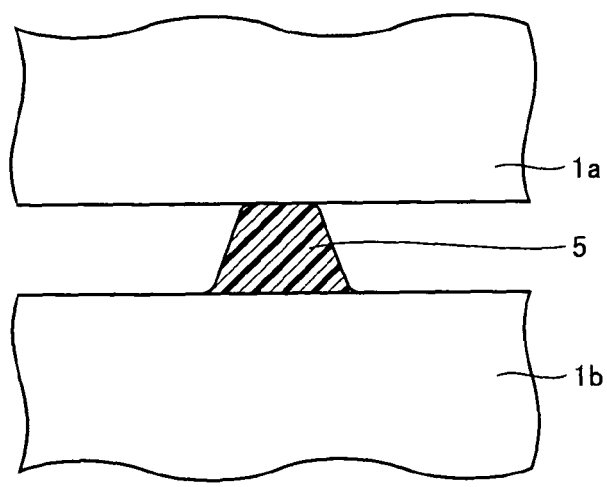
FIG. 7B is a second schematic cross section illustrating a manner compressing a columnar spacer.

Referring to FIGS. 6 to 7B, description will now be given on a method of manufacturing the liquid crystal display panel of this embodiment. The manufacturing method of this embodiment includes a spacer forming step of forming the columnar spacers on one or both of the two substrates to be adhered together, and a seal member arranging step of arranging the seal member(s) on the main surface(s) of one or both of the two substrates to be adhered together. The method also includes a liquid crystal drop applying step of applying drops of the liquid crystal onto one of the substrates, and particularly onto a region that will be located inside the annular seal member. The manufacturing method of this embodiment is a so-called drop adhering method in which two substrates are adhered together in a vacuum after the liquid crystal drop applying step. The manufacturing method of this embodiment will now be described primarily in connection with the method of manufacturing the first liquid crystal display panel.

FIG. 6 is a schematic cross section showing adhesion of the two substrates. In the spacer forming step, columnar spacers 5 of a substantially uniform height are formed on substrate 1b by the photolithography method. Columnar spacers 5 are formed in a region where liquid crystal is to be sealingly stored. In a central portion of the display region, there is formed high-density region 31 including columnar spacers 5 at a high number density. In a portion outside high-density region 31 and near the inner side of annular seal member 2, there is formed low-density region 32 including columnar spacers 5 at a lower number density than high-density region 31.

Annular seal member 2 is arranged on the main surface of substrate 1a. Drops of liquid crystal 6 are applied onto a region of the main surface of substrate 1a surrounded by seal member 2. The drop quantity of liquid crystal 6 is slightly smaller than a designed value determined when the two substrates are parallel spaced from each other by a designed value.

The two substrates are combined together as indicated by an arrow 50 in FIG. 6. The adhesion is performed in a vacuum. After the combination, a surrounding space is opened to an atmospheric pressure so that the atmospheric pressure is applied to the whole surface of two substrates 1a and 1b, and thereby presses substrates 1a and 1b to each other.

FIGS. 7A and 7B are schematic cross sections showing, on an enlarged scale, the columnar spacer in the process of adhering two substrates 1a and 1b. FIG. 7A is the schematic enlarged cross section of the columnar spacer formed on the substrate. Columnar spacer 5 formed on the main surface of substrate 1b has a circular cylindrical form having a top surface of a diameter smaller than that of a bottom surface. Columnar spacers 5 are made of acrylic resin or the like. Columnar spacer 5 has such properties that it is more resistant to collapse than a plastic bead or the like. However, columnar spacer 5 has a margin for allowing compression by a compression width 40 shown in FIG. 7A when substrate 1a is adhered to substrate 1b as shown in FIG. 7B. The height of columnar spacer 5 varies depending on the types such as a reflection-type liquid crystal display panel and a transparent-type liquid crystal display panel, but is substantially equal to several micrometers, and compression width 40 is equal to about $1/10$ μm. As described above, columnar spacer 5 is compressed only slightly. However, columnar spacer 5 is compressed to an extent that can absorb a manufacturing error of columnar spacer 5, and produces a portion where the distance between the two substrates decreases as shown in FIG. 3A or 3C. In this manner, the manufacturing error in height of the columnar spacer is naturally absorbed, and the liquid crystal display panel preventing lowering of the display quality can be manufactured without complicating the adhesion operation.

In this embodiment, the drop quantity of liquid crystal is equal to 96% of the standard liquid crystal calculated value. By applying the liquid crystal drops of the quantity smaller than the standard liquid crystal calculated value, it is possible to prevent occurrence of vacuum bubbles and irregularities on the display surface in either of the cases where the columnar spacer has the height of the designed value and where it has the height smaller or larger than the designed value.

For the second liquid crystal display panel of the embodiment, it is simply required to form, in each necessary region, the region including the columnar spacers at a small number density and the region including the columnar spacers at a large number density. By employing this method, it is possible to manufacture the second liquid crystal display panel of this embodiment. For the third liquid crystal display panel, the columnar spacers are formed such that the number density thereof gradually decreases as the position moves from the center of the display region to be formed toward the outer periphery.

The columnar spacers can be formed by the known photolithography or the like. The columnar spacer of this embodiment has the circular cylindrical form. However, the columnar spacer is not restricted to this form, and may have, e.g., a quadrangular prism form. It is preferable that the number density of the columnar spacers, the material of the columnar spacer and/or the quantity of stored liquid crystal are appropriately changed according to the size and type of the liquid crystal display panel.

Second Embodiment

Figure 8A:
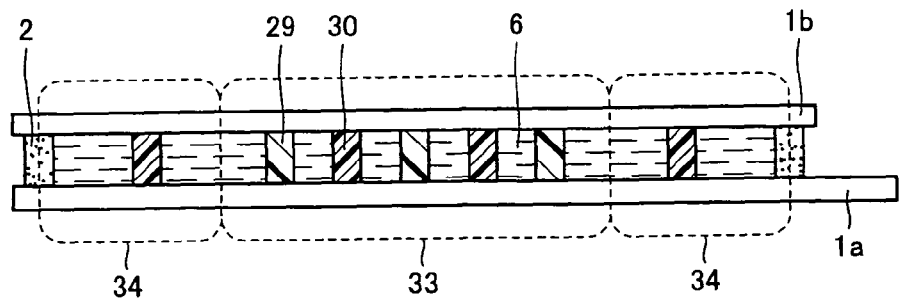
FIG. 8A is a schematic cross section of a liquid crystal display panel of a second embodiment.
Figure 10:
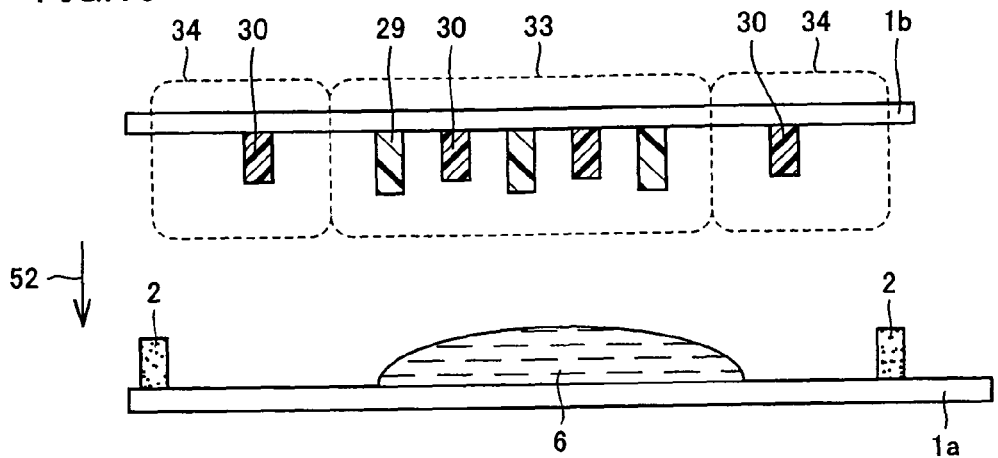
FIG. 10 illustrates a method of manufacturing the liquid crystal display panel in the second embodiment.
Figure 11:
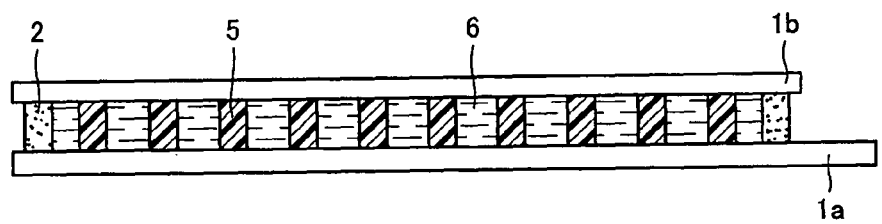
FIG. 11 is a schematic cross section of a liquid crystal display panel according to a prior art.
Figure 12A:
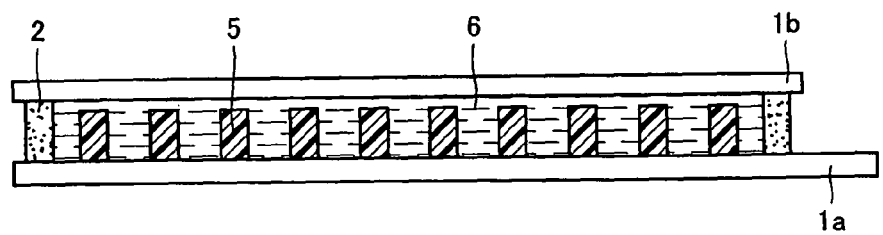
FIG. 12A is a first schematic cross section illustrating disadvantages of the liquid crystal display panel according to the prior art.
Figure 12B:
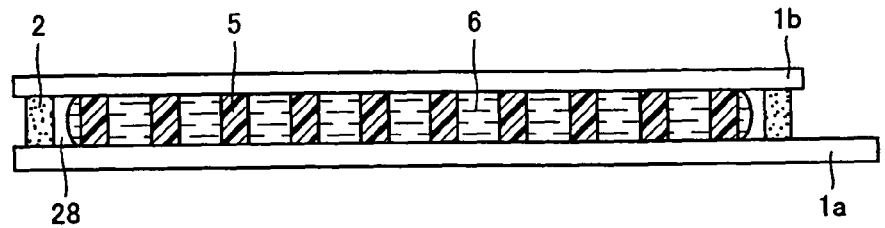
FIG. 12B is a second schematic cross section illustrating disadvantages of the liquid crystal display panel according to the prior art.

Referring to FIGS. 8A and 10, description will now be given on a liquid crystal display panel of a second embodiment according to the invention as well as a method of manufacturing the liquid crystal display panel.

Figure 8B:
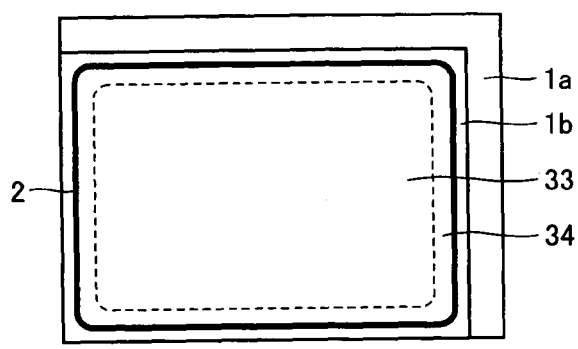
FIG. 8B is a schematic plan of the liquid crystal display panel of a second embodiment.

FIGS. 8A and 8B illustrate the liquid crystal display panel of this embodiment. FIG. 8A is a schematic cross section, and FIG. 8B is a schematic plan. Two substrates 1a and 1b are fixed together by seal member 2, and the space surrounded by two substrates 1a and 1b and seal member 2 is filled with liquid crystal, as is done in the liquid crystal display panel of the first embodiment.

The liquid crystal display panel of this embodiment includes a low spacer arrangement region 34 as a first region near the inner side of seal member 2, and also includes a high-low spacer arrangement region 33 as a second region located inside low spacer arrangement region 34. The liquid crystal display panel includes first columnar spacers arranged in low spacer arrangement region 34 and high-low spacer arrangement region 33 as well as second columnar spacers arranged in high-low spacer arrangement region 33. In this embodiment, low columnar spacers 30 are formed as the first columnar spacers, and high columnar spacers 29 are formed as the second columnar spacers. High columnar spacer 29 is higher than low columnar spacer 30 when no load is applied thereto. In other words, when high columnar spacer 29 is released from a pressure applied by the two substrates, high columnar spacer 29 is higher than low columnar spacer 30.

Figure 9A:
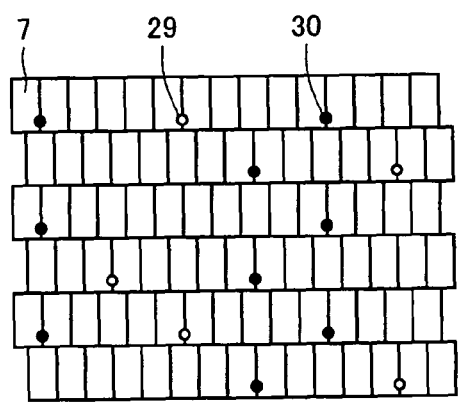
FIG. 9A is a first plan illustrating an arrangement distribution of columnar spacers in the second embodiment.
Figure 9B:
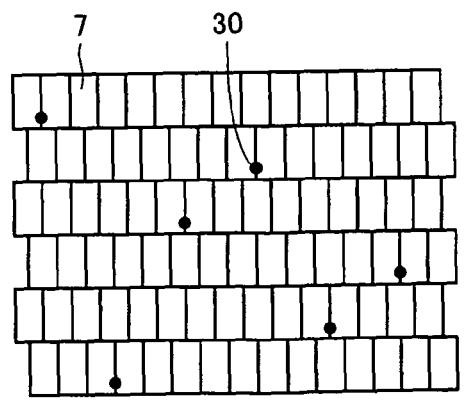
FIG. 9B is a second plan illustrating an arrangement distribution of columnar spacers in the second embodiment.

FIGS. 9A and 9B illustrate arrangements of the columnar spacers in low and high-low spacer arrangement regions 34 and 33. FIG. 9A is a plan of high-low spacer arrangement region 33. The two kinds of columnar spacers, i.e., high and low columnar spacers 29 and 30 are formed at interconnection regions in the boundary portions between the picture elements. High and low columnar spacers 29 and 30 are arranged in a mixed fashion. FIG. 9B is a plan of low spacer arrangement region 34. Only low columnar spacers 30 having a small height are formed in low spacer arrangement region 34. Between two substrates, there is sealingly stored the liquid crystal of the quantity required when the two substrates are adhered parallel to each other, i.e., the quantity of the standard liquid crystal calculated value.

As described above, the liquid crystal display panel of the embodiment includes the two spacers having different heights when these are released from a pressure in the height direction. For example, in the liquid crystal display panel having the picture elements each having a longitudinal size of 115 μm and a lateral size of 65 μm, high columnar spacers 29 each having a diameter of 10 μm and a height of 4.5 μm are arranged at a rate of one spacer per ten picture elements. Further, low columnar spacers 30 each having a diameter of 10 μm and a height of 4.3 μm are arranged at a rate of one spacer per fifteen picture elements. In low spacer arrangement region 34, low columnar spacers 30 each having a diameter of 10 μm and a height of 4.3 μm are arranged at a rate of one spacer per fifteen picture elements. The designed distance between the two substrates is equal to the designed height of the low columnar spacer.

In the liquid crystal display panel of the embodiment, since high columnar spacers 29 are arranged in high-low spacer arrangement region 33 at the higher number density than low columnar spacers 30 arranged in low spacer arrangement region 34, two substrates 1a and 1b in high-low spacer arrangement region 33 have the main surfaces parallel to each other. Further, the distance between two substrates 1a and 1b in low spacer arrangement region 34 can be reduced with higher priority than that in high-low spacer arrangement region 33.

When each columnar spacer has the height of the designed value, high columnar spacer 29 is compressed with higher priority than low columnar spacer 30, and the compression thereof stops when the height of high columnar spacer 29 becomes equal to that of low columnar spacer 30 (i.e., designed distance between the two substrates). As shown in FIG. 8A, the two substrates become parallel.

When the height of the columnar spacer is smaller than the designed value, high columnar spacers 29 in high-low spacer arrangement region 33 are not sufficiently compressed, and the distance between the substrates in high-low spacer arrangement region 33 becomes larger than the distance between the substrates in low spacer arrangement region 34.

When the height of the columnar spacer is larger than the designed value, high columnar spacers 29 are compressed to the height equal to that of low columnar spacers 30, and the distance between substrates 1a and 1b decreases in low spacer arrangement region 34 so that occurrence of the vacuum bubbles can be prevented.

As described above, the size of the space filled with the liquid crystal can be adjusted in both the high-low spacer arrangement region and the low spacer arrangement region. Therefore, the liquid crystal display panel of this embodiment can have a large margin for canceling a manufacturing error of the columnar spacers. In both the cases where the height of the formed columnar spacer is larger than the designed value and where it is smaller than the designed value, lowering of the display quality can be prevented without employing such a configuration that the quantity of the stored liquid crystal cell is smaller than the standard liquid crystal calculated value.

Referring to FIG. 10, description will now be given on the method of manufacturing the liquid crystal display panel of the embodiment.

The columnar spacers are formed on substrate 1b by the photolithography method, and annular seal member 2 is formed. Then, the drops of liquid crystal 6 are put inside annular seal member 2. These manners are the same as those in the manufacturing method of the first embodiment.

According to the second embodiment, the spacer forming step of forming the columnar spacers on substrate 1b is configured such that low spacer arrangement region 34 is formed as the first region near the inner side of the seal member, and high-low spacer arrangement region 33 is formed as the second region inside low spacer arrangement region 34. Only low columnar spacers 30 serving as the first columnar spacers are formed in low spacer arrangement region 34. In high-low spacer arrangement region 33, low columnar spacers 30 as well as high columnar spacers 29 higher than low columnar spacers 30 are formed. Annular seal member 2 is arranged on substrate 1a, and liquid crystal 6 is arranged inside the region surrounded by seal member 2. Drops of liquid crystal 6 of the standard liquid crystal calculated value are applied.

The adhesion of the two substrates is performed in a vacuum atmosphere. As indicated by an arrow 52, the main surfaces of substrates 1a and 1b are pressed after adhering the two substrates in the vacuum atmosphere. In this manner, the compression is performed to locate the main surfaces of substrates 1a and 1b closer.

In high-low spacer arrangement region 33, high columnar spacers 29 are formed in addition to low columnar spacers 30. For adhesion, high columnar spacers 29 come into contact with substrate 1a prior to low columnar spacers 30. By applying the pressure to the main surfaces of substrates 1a and 1b, high columnar spacers 29 are first compressed, and the compression will naturally stop when the quantity of liquid crystal 6 matches with the volume of the space surrounded by two substrates 1a and 1b.

When the height of the formed columnar spacers is low, the compression stops during compression of the high columnar spacers so that the gap in high-low spacer arrangement region 33 becomes larger than that in low spacer arrangement region 34. Conversely, when the height of the formed columnar spacers is large, the distance between substrates 1a and 1b decreases in low spacer arrangement region 34. As described above, the adhesion of the two substrates can be performed depending on the manufacturing error of the columnar spacers while preventing occurrence of vacuum bubbles.

Consequently, it is possible to manufacture the liquid crystal display panel that prevents lowering of the display quality due to occurrence of the vacuum bubbles and the like, similarly to the manufacturing method of the first embodiment. Further, it is possible to manufacture the liquid crystal display panel that prevents occurrence of irregularities in display even when the display unit is pressed by a finger or the like.

Structures, operations and effects other than the above are the same as those of the liquid crystal display panel of the first embodiment, and therefore description thereof is not repeated.

In the figures relating to the first and second embodiments, the relative magnitudes of the heights of columnar spacers and the distances between the substrates are exaggerated for ease of understanding. In the invention, there is a portion where the main surfaces of the two substrates are not parallel to each other, but this portion causes only a small change, and does not affect the display quality. The invention can be applied to both the monochrome liquid crystal display panel and the color liquid crystal display panel.

Third Embodiment

This embodiment will now be described in connection with a substrate with spacers for use in a liquid crystal panel. The substrate with spacers according to the invention can be used not only in the liquid crystal panel but also in an organic EL panel, inorganic EL panel, plasma panel, field emission panel, electrochromic panel and others. The liquid crystal panel can be applied not only to the liquid crystal display panel but also to a picture shift panel that optically and successively shifts pixels as well as a parallax barrier panel that allows display of three-dimensional pictures. The picture shift panel includes at least one set of the liquid crystal panel modulating a polarization state of light and birefringent elements combined with the liquid crystal panel for shifting a light path according to the polarization state of light coming from the liquid crystal panel. The parallax barrier panel is combined with picture display elements having pixels for the left eye and pixels for the right eye, and thereby can display three-dimensional pictures.

Referring to FIGS. 13 to 18, the third embodiment of the invention will now be described.

Figure 13:
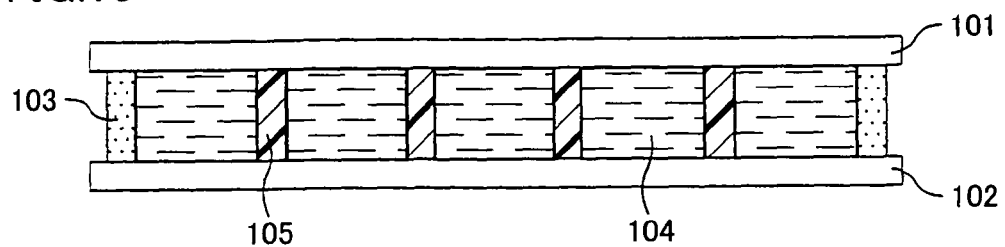
FIG. 13 is a cross section schematically illustrating a liquid crystal display panel using a substrate with spacers of a third embodiment.

FIG. 13 is a cross section schematically showing a liquid crystal panel using a substrate with a spacer of the third embodiment. The liquid crystal panel has a pair of substrates 101 and 102, a peripheral seal member 103 held between substrates 101 and 102, a liquid crystal layer 104 located between substrates 101 and 102 and surrounded by peripheral seal member 103, and a spacer 105 for keeping a uniform cell gap of liquid crystal layer 104. Substrate 101 is a color filter substrate, and has a color filter layer (not shown), transparent electrodes made of ITO (Indium Tin Oxide) and a liquid crystal alignment film (not shown) made of polyimide and the like and subjected to rubbing processing. The other substrate 102 is a TFT (Thin Film Transistor) substrate, and has a plurality of gate bus lines (not shown) each extending in a row direction, a plurality of source bus lines (not shown) crossing the gate bus lines, TFTs (not shown) arranged near crossings of the gate and source bus lines, pixel transparent electrodes (not shown) arranged in a matrix form and connected to the source bus lines (not shown) via the TFTs and a liquid crystal alignment film (not shown) covering the pixel transparent electrodes.

Substrates 101 and 102 may be made of glass such as silica glass, soda lime glass, borosilicate glass, low alkali glass or non-alkali glass, plastics such as polyester or polyimide, or semiconductor such as silicon.

Figure 14:
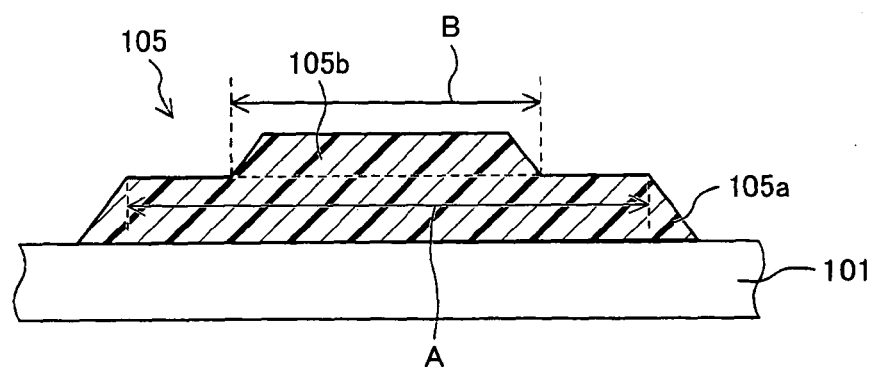
FIG. 14 is a cross section schematically showing on an enlarged scale a spacer 105 of the third embodiment.
Figure 15:
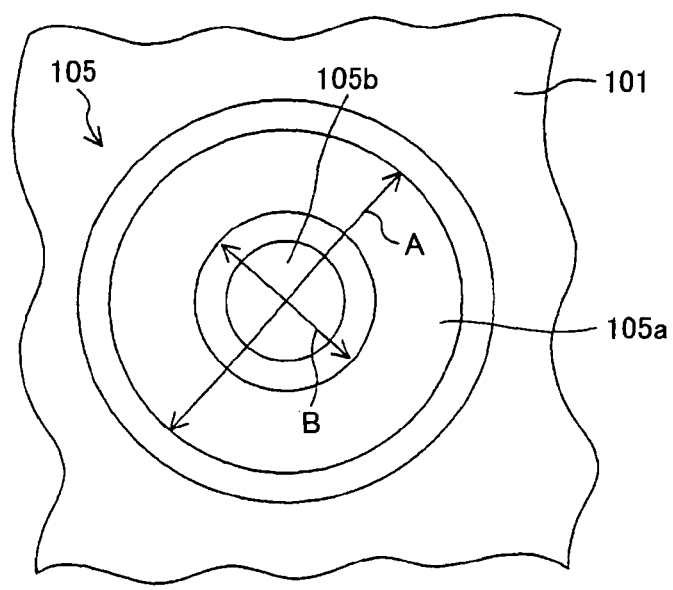
FIG. 15 is a plan of spacer 105 of the third embodiment.

FIG. 14 is a cross section schematically showing, on an enlarged scale, spacer 105 of the embodiment. FIG. 15 is a plan of spacer 105. This embodiment will now be described in connection with a structure having spacers 105 formed on color filter substrate 101, but spacers 105 may be formed on TFT substrate 102.

Spacer 105 has a first spacer portion 105a and a second spacer portion 105b formed above first spacer portion 105a. Each of first and second spacer portions 105a and 105b has a truncated conical form, and an upper portion of first spacer portion 105a has a diameter A larger than a diameter B of a bottom portion of second spacer portion 105b.

As shown in FIGS. 14 and 15, spacer 105 has a form of a combination of first spacer portion 105a having a relatively large top area (i.e., area of a top surface) and second spacer portion 105b having a relatively small top surface. By employing this combination form, damages due to rubbing processing can be effectively suppressed in spite of the fact that a portion (second spacer portion 105b) having a relatively small top area is located at a high position spaced from the surface of substrate 101.

Figure 16:
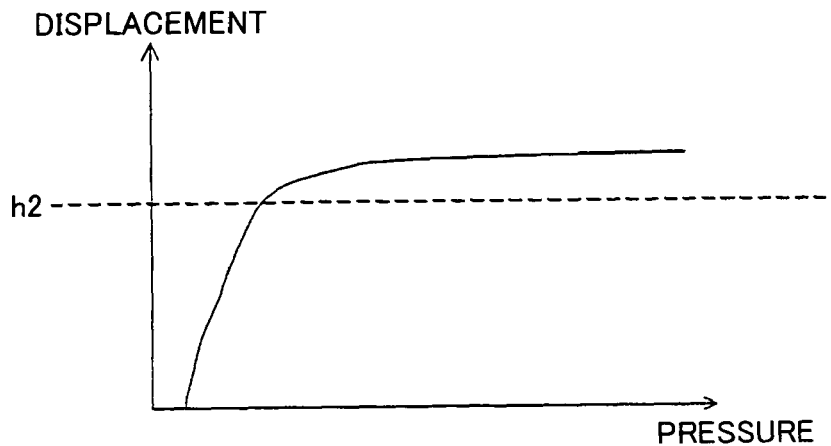
FIG. 16 is a graph illustrating load-displacement characteristics of spacer 105 of the third embodiment.

Since second spacer portion 105b having the relatively small top area is formed above first spacer portion 105a having the relatively large top area (area of the top surface), load-displacement characteristics of the spacer can change stepwise. FIG. 16 is a graph illustrating the load-displacement characteristics of spacer 105 of this embodiment. As illustrated in FIG. 16, the load-displacement characteristics in the graph represent a steep curve before the displacement exceeds a height h2 of second spacer portion 105b, and the load-displacement characteristics significantly change to represent a relatively gentle curve according to increase in load after the displacement exceeds height h2 of second spacer portion 105b. More specifically, when the load is applied after the displacement exceeds height h2 of second spacer portion 105b, further displacement is substantially suppressed. Thereby, second spacer portion 105b can elastically deform to follow the load caused by an error in liquid crystal drop quantity and changes in temperature. When a large pressure is locally applied, the stress of first spacer portion 105a substantially suppresses deformation of the panel.

Figure 17:
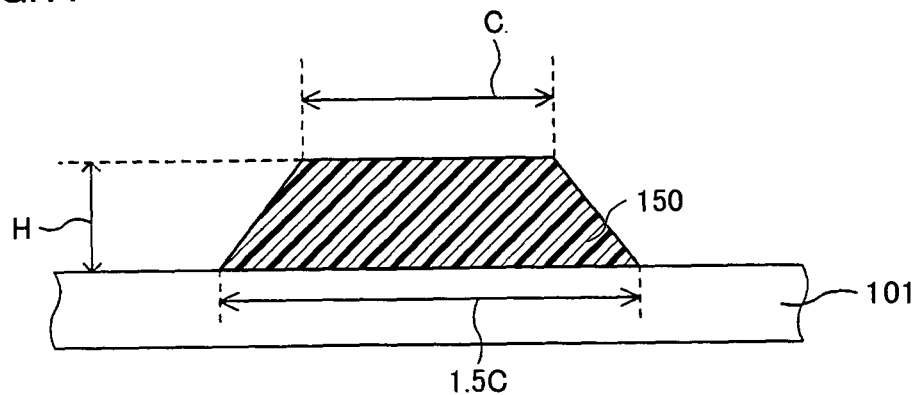
FIG. 17 is a cross section schematically showing a spacer 150, which is an example for comparison.

For a comparison with this embodiment, an example for the comparison will now be described. FIG. 17 is a cross section schematically showing a spacer 150 of the example for comparison. Spacer 150 has a single truncated conical form as shown in FIG. 17. Since the spacer is generally formed by the photolithography method, a diameter C of an upper portion of spacer 150 depends on an accuracy of an exposing device and the like. When a general exposing device of a proximity type is used, upper diameter C of spacer 150 is in a range from about 6 to about 10 μm, and the bottom diameter of spacer 150 is about (1.5×C) μm. Therefore, an aspect ratio of spacer 150 is about (H/(1.5×C)) where H (μm) is a height of spacer 150. By using the exposing device of, e.g., a stepper type or a mirror projection type having a high accuracy, it is possible to produce spacers of further reduced sizes. However, spacers having excessively small sizes may break in rubbing processing.

Figure 18:
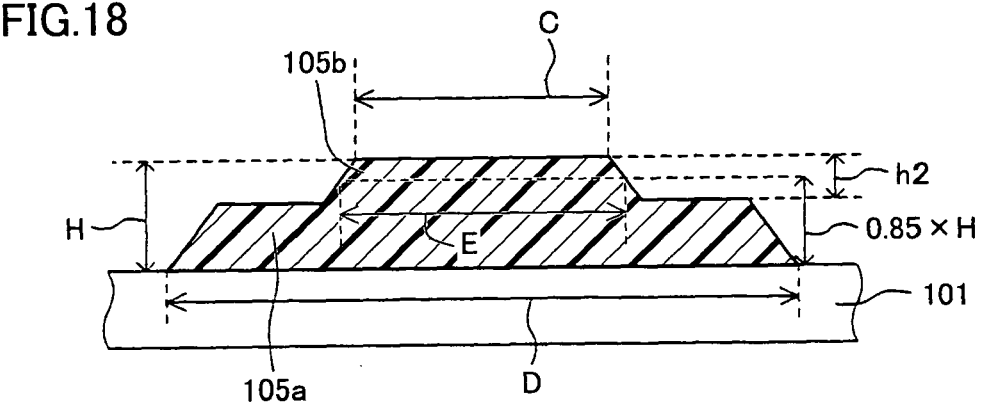
FIG. 18 is a cross section for illustrating sizes of spacer 105 of the third embodiment.

FIG. 18 is a cross section for illustrating sizes of spacer 105 of the embodiment. Spacer 105 of the embodiment has a structure corresponding to a vertical combination of first and second spacer portions 105a and 105b each having a truncated conical form. Since upper diameter A of first spacer portion 105a is larger than bottom diameter B of second spacer portion 105b, a bottom diameter D of spacer 105 can be longer than that of spacer 150 of the comparison example. For example, bottom diameter D of spacer 105 can be (1.8×C) or more. Therefore, the aspect ratio of spacer 105 can be equal to or smaller than (H/(1.8×C)), and thus can be smaller than that of spacer 150 of the comparison example so that breakage in the rubbing processing can be prevented even when the spacers have small sizes.

Typical sizes of spacer 105 will now be described. Since it is economically advantageous to use the exposing device of the proximity type, the following description is given on the case where the exposing device of the proximity type is used. Since the accuracy limit of the exposing device of the proximity type is about 6 μm, the possible minimum value of upper diameter C of second spacer portion 105b is about 6 μm. Also, spacer 105 (i.e., first spacer portion 105a in this embodiment) is configured to have bottom diameter D that is larger by 1.8 times or more than top diameter C of second spacer portion 105b. However, when bottom diameter D of spacer 105 is excessively large, spacer 105 protrudes over a pixel opening, and exerts adverse effect on display, e.g., by lowering the transmittance and reflectance. Accordingly, spacer 105 has bottom diameter D of about 14 μm for preventing protrusion over the pixel opening. When second spacer portion 105b has upper diameter C of 6 μm, it is preferable that the spacer density in the cell is about 1000 pcs/cm$^2$.

Height H of spacer 105 is substantially equal to the cell gap of liquid crystal layer 104. More specifically, it is about 5 μm in the transparent type, and is about 2.5 μm in the reflection display type. However, spacers 105 slightly collapse when substrates 101 and 102 are overlaid, and therefore height H of spacer 105 becomes equal to a value obtained by adding an prospected value (about 0.2 μm) of such collapse to the cell gap. For example, it is about 5.2 μm in the transparent type, and is 2.7 μm in the reflection display type.

Second spacer portion 105b elastically deforms according to the load caused by an error of the liquid crystal drop quantity and changes in temperature. Height h2 of second spacer portion 105b is set to a value that prevents spacer 105 from collapsing by a predetermined thickness or more even when it locally receives a large stress. Height h2 is determined in view of the liquid crystal drop quantity, variations in height of spacers 105, shifting of cell gaps on the surface due to expansion of the liquid crystal material and others. Height h2 of second spacer portion 105b is preferably in a range from 0.4 μm to 0.7 μm, and is typically equal to 0.5 μm.

In spacer 105 of the embodiment having height H from the bottom to the top, a diameter E of spacer 105 at a height of (0.85×H) from the bottom is equal to or smaller than (1.05× C), i.e., 1.05 times of diameter C of the top of spacer 105.

Description will now be given on steps of manufacturing the liquid crystal display panel using the substrates with the spacer of the embodiment. First, the color filter layer and the transparent electrodes are successively formed on substrate 101 by the sputter method and print method. Acrylic resin resist of an ultraviolet curing type is applied onto substrate 101 and is dried, and then spacers 105 are formed at light interception positions between pixels by the photolithography method. The photolithography method uses a gradation photomask having a light intercepting portion for partially changing the light transmittance continuously or stepwise (e.g., Japanese Patent Laying-Open No. 2002-229040). After the exposure using the gradation photomask, development is performed to form spacers 105 having different heights (i.e., exhibiting a stepped portion). Further, polyimide which is an alignment film material is applied to substrate 101, and the rubbing processing is effected to form the alignment film.

Various kinds of bus lines, insulating films, TFTs and pixel transparent electrodes are formed on the other substrate 102 by the photolithography method and the print method, and thereafter the alignment film subjected to the rubbing processing is formed to cover the pixel transparent electrodes. Peripheral seal member 103 of the ultraviolet curing type containing epoxy resin is formed on one of substrates 101 and 102 by the screen-print method and the dispenser method. Peripheral seal member 103 has a pattern of a loop form, and does not have an opening providing a liquid crystal inlet. After applying drops, e.g., of nematic liquid crystal material to a region inside the pattern frame of peripheral seal member 103, two substrates 101 and 102 are overlaid with each other in the vacuum chamber to form liquid crystal layer 104 in the gap between substrates 101 and 102.

The distance between substrates 101 and 102, i.e., the thickness (cell gap) of liquid crystal layer 104 depends on the quantity of the applied liquid crystal material drops and the height of peripheral seal member 103. However, irregularities in the cell gap are liable to occur on the surface if the cell gap is determined only by the liquid crystal material and peripheral seal member 103. Since a member defining the cell gap is not present in a region other than the peripheral portion of the panel, the panel is significantly affected by an external pressure to cause display irregularities. In this embodiment, spacers 105 defining the cell gap are arranged to keep the cell gap substantially uniform in the display region on substrate 101. Therefore, the external pressure hardly affects the panel so that the display irregularities hardly occur.

In this embodiment, since second spacer portion 105b on first spacer portion 105a absorbs the load caused by the error in liquid crystal drop quantity and the changes in temperature, it is possible to suppress the display irregularities due to nonuniformity in cell gap on the surface. Since first spacer portion 105a has upper diameter A longer than bottom diameter B of second spacer portion 105b, the stress of first spacer portion 105a can function to keep the display quality by suppressing deformation which may be cause by a local large stress occurring at the time of adhering the substrates.

After overlaying substrates 101 and 102 with each other, ultraviolet light is applied for provisionally curing a portion of the seal member (which may also be referred to as a "dummy seal member") at the position other than peripheral seal member 103. The panel is taken out from the vacuum chamber, and peripheral seal member 103 is irradiated with the ultraviolet light to cure peripheral seal member 103. Through the above steps, the liquid crystal panel shown in FIG. 13 is completed.

Although the liquid crystal panel of this embodiment uses the TFTs as the liquid crystal drive elements, another type of active drive elements such as MIM (Metal Insulator Metal) may be used, or passive (multiplex) drive not using the drive element may be employed. When using the liquid crystal panel as the display panel, it can be applied to the display panel of any one of the transparent type, reflection type and transparent-reflection dual type.

This embodiment has been described in connection with the method of manufacturing the liquid crystal panel by the liquid crystal drop adhesion method. However, another type of liquid crystal panel may be produced using the substrates with the spacer according to the invention.

Fourth Embodiment

Figure 19:
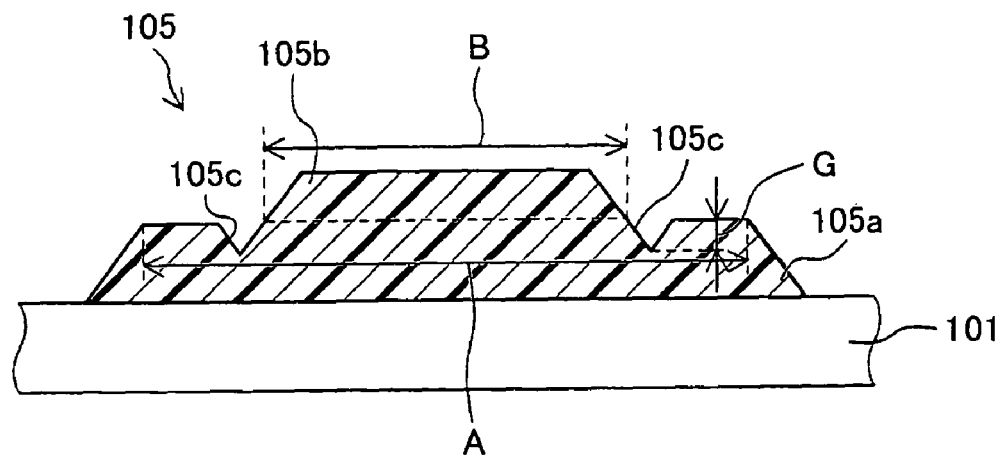
FIG. 19 is a cross section schematically showing a substrate with spacers of a fourth embodiment.
Figure 20:
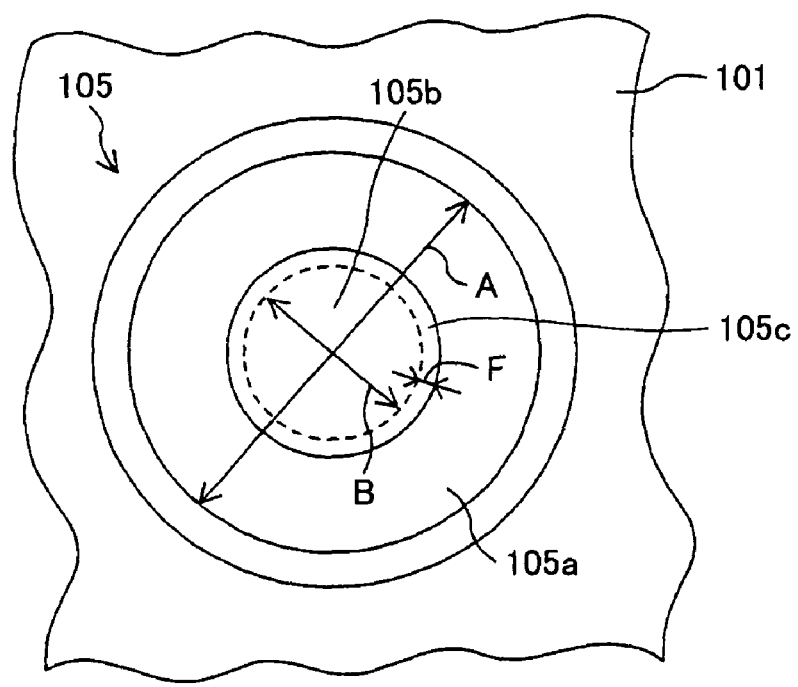
FIG. 20 is a plan of the substrate with spacers of the fourth embodiment.

FIG. 19 is a cross section schematically showing the substrate with the spacer according to a fourth embodiment of the invention, and FIG. 20 is a plan thereof. Spacer 105 of this embodiment is substantially the same as spacer 105 of the third embodiment except for that first spacer portion 105*a* has a groove 105*c* at its upper portion. Therefore, the forms, sizes and manufacturing method of spacers 105 of this embodiment are substantially the same as those of the third embodiment, and description thereof is not repeated.

Groove 105*c* formed near the bottom of second spacer portion 105*b* surrounds second spacer portion 105*b* in a plan view. Although groove 105*c* in this embodiment has a continuously annular form, it may be discontinuous. Groove 105*c* has a V-shaped sectional form in FIG. 19, but may have another form such as a U-shaped form. Although a width F of groove 105*c* is not particularly restricted, it is preferably in a range from 0.2 μm to 2 μm. Likewise, a depth G of groove 105*c* is not particularly restricted, but is preferably in a range from 0.2 μm to 1 μm.

In a plan view, groove 105*c* surrounds second spacer portion 105*b* so that second spacer portion 105*b* can readily and elastically deform according to the load caused by the error in liquid crystal drop quantity and the changes in temperature, and the load can be absorbed more reliably.

Fifth and Sixth Embodiments

Figure 21A:
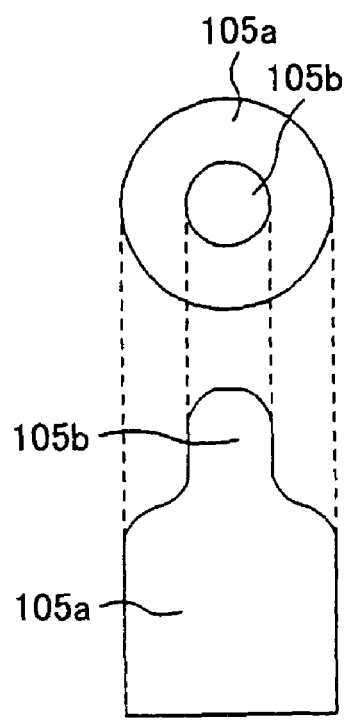
FIG. 21A is a plan (upper) and a cross section (lower) schematically showing a spacer of a fifth embodiment.
Figure 21B:
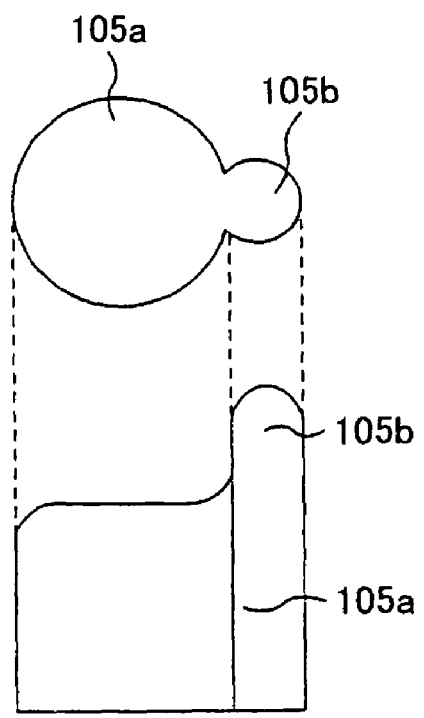
FIG. 21B is a plan (upper) and a cross section (lower) schematically showing a spacer of a sixth embodiment.

In the third and fourth embodiments, each of first and second spacer portions 105*a* and 105*b* has the truncated conical form, but the forms of first and second spacer portions 105*a* and 105*b* are not restricted to it. FIGS. 21A and 21B schematically show spacers of fifth and sixth embodiments, respectively, and each include a plan (upper portion) and a cross section (lower portion).

As shown in FIG. 21A, each of first and second spacer portions 105*a* and 105*b* has a circular cylindrical form, and second spacer portion 105*b* may be formed substantially at a center of the top portion of first spacer portion 105*a*. Alternatively, as shown in FIG. 21B, second spacer portion 105*b* may be formed at a periphery of the top portion of first spacer portion 105*a*. Spacer 105 shown in each of FIGS. 21A and 21B can substantially achieve effects similar to those of spacers 105 of the third and fourth embodiment.

Other Embodiments

First and second spacer portions 105*a* and 105*b* in the third and fourth embodiments have the truncated conical forms, and those in the fifth embodiment have the circular cylindrical form. In other words, each of spacer portions 105*a* and 105*b* in the third to fifth embodiments has the circular top and circular bottom surface. However, the forms of the top and bottom surfaces of spacer portions 105*a* and 105*b* are not particularly restricted, and for example, these may be polygonal or elliptic. Each of the top surfaces of spacer portions 105*a* and 105*b* may not be parallel to the substrate surface, and may be inclined with respect to the substrate surface. When a sectional surface, which is parallel to the substrate surface, of the top or bottom portion of spacer portion 105*a* or 105*b* is not circular, the longest line segment among straight line segments crossing the sectional surface is referred to as the "diameter".

The third to sixth embodiments have been described in connection with the structures that include spacers 105 each formed of two spacer portions 105*a* and 105*b*. However, the spacer may have a multi-step structure formed of more than two spacer portions.

Although the present invention has been described and illustrated in detail, it is clearly understood that the same is by way of illustration and example only and is not to be taken by way of limitation, the spirit and scope of the present invention being limited only by the terms of the appended claims.

INDUSTRIAL APPLICABILITY

The invention can be advantageously applied to the liquid crystal display panel and the method of manufacturing the liquid crystal display panel. The substrate with spacers according to the invention can be used in the organic EL panel, inorganic EL panel, plasma panel, field emission panel, electrochromic panel and others.

The invention claimed is:

1. A liquid crystal display panel comprising:
   two substrates fixed together by a seal member with their main surfaces opposed to each other;
   liquid crystal sealingly stored in a region surrounded by said two substrates and said seal member; and
   a plurality of columnar spacers arranged in the region surrounded by said two substrates and said seal member, wherein
   said columnar spacers include:
   a first columnar spacer, and
   a second columnar spacer being higher than said first columnar spacer when receiving no load;
   said first columnar spacer is arranged in a first region near an inner side of said seal member and a second region located inside said first region; and
   said second columnar spacer is arranged in said second region, and wherein
   said column spacers include a plurality of first columnar spacers and a plurality of second columnar spacers,
   the second column spacers having a height and a width, where the height of the second column spacers are 45 percent of the width of the second column spacers,
   the first column spacers having a height and a width, where the height of the first column spacers are 43 percent of the width of the first column spacers,
   each of said plurality of second column spacers are arranged at a rate of one spacer per ten picture elements, and
   each of said plurality of first column spacers are arranged at a rate of one spacer per fifteen picture elements.

2. A liquid crystal display panel comprising a substrate and a spacer; and the spacer formed on said substrate, wherein
   said spacer has at least a first spacer portion, and a second spacer portion formed above said first spacer portion, and an upper portion of said first spacer portion has a larger diameter than a bottom of said second spacer portion, the upper portion of said first spacer portion has a groove surrounding said second spacer portion in a plan view, and the width of the groove being in the range of from 0.2 μm to 2 μm.

3. The liquid crystal display panel according to claim 2, wherein assuming that an upper portion of said spacer has a diameter of C, and said spacer has a height of H from the bottom to the upper portion, said spacer has a diameter of (1.8×C) or more at the bottom, and has a diameter of (1.05×C) or less at a height of (0.85×H) from the bottom of said spacer.

4. A liquid crystal display panel according to claim 2; an opposed substrate opposed to said substrate with the spacer, and a function material layer interposed between said substrate with the spacer and said opposed substrate.

5. The liquid crystal display panel according to claim 4, wherein said function material layer is a liquid crystal layer.

6. A method of manufacturing the liquid crystal display panel according to claim 5, comprising the steps of:

forming a frame-like seal member on a substrate surface of one of said substrate with the spacer and said opposed substrate;

applying a liquid crystal material to an inside of a frame of said seal member; and adhering said substrate with the spacer and said opposed substrate together to form said liquid crystal layer.

* * * * *

UNITED STATES PATENT AND TRADEMARK OFFICE
CERTIFICATE OF CORRECTION

PATENT NO. : 7,859,635 B2
APPLICATION NO. : 10/574617
DATED : December 28, 2010
INVENTOR(S) : Naoto Yokoyama et al.

It is certified that error appears in the above-identified patent and that said Letters Patent is hereby corrected as shown below:

In claim 4, line 1 (at column 22, line 1), change "A" to --The--.

Signed and Sealed this
Twenty-fourth Day of May, 2011

David J. Kappos
*Director of the United States Patent and Trademark Office*